United States Patent
Tagawa

(10) Patent No.: US 9,185,262 B2
(45) Date of Patent: Nov. 10, 2015

(54) IMAGE READING DEVICE AND IMAGE FORMING APPARATUS

(71) Applicant: KYOCERA Document Solutions Inc., Osaka (JP)

(72) Inventor: Hirotoshi Tagawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/525,483

(22) Filed: Oct. 28, 2014

(65) Prior Publication Data

US 2015/0116793 A1 Apr. 30, 2015

(30) Foreign Application Priority Data

Oct. 31, 2013 (JP) ................ 2013-226776

(51) Int. Cl.
| | |
|---|---|
| H04N 1/04 | (2006.01) |
| H04N 1/40 | (2006.01) |
| H04N 1/193 | (2006.01) |
| H04N 1/028 | (2006.01) |
| H04N 1/10 | (2006.01) |
| H04N 1/00 | (2006.01) |

(52) U.S. Cl.
CPC ....... *H04N 1/40056* (2013.01); *H04N 1/00013* (2013.01); *H04N 1/00037* (2013.01); *H04N 1/00082* (2013.01); *H04N 1/00092* (2013.01); *H04N 1/02895* (2013.01); *H04N 1/10* (2013.01); *H04N 1/193* (2013.01); *H04N 2201/0081* (2013.01); *H04N 2201/0094* (2013.01); *H04N 2201/0418* (2013.01); *H04N 2201/0438* (2013.01)

(58) Field of Classification Search
CPC .......... H04N 1/00087; H04N 1/00997; H04N 1/02815; H04N 9/3182; H04N 9/735; H01L 2924/0002; H01L 2924/00; H01L 22/12; H01L 27/14; H01L 27/3246; H01L 27/3258; H01L 27/3269; H01L 51/5265; H01L 51/528
USPC ........... 399/49, 51, 12, 16, 301, 222, 27, 299, 399/45, 46, 71, 74; 358/475, 1.14, 1.2, 1.5, 358/1.9, 3.24; 362/257, 3, 311.01; 382/224
See application file for complete search history.

(56) References Cited

U.S. PATENT DOCUMENTS

| | | | | |
|---|---|---|---|---|
| 4,694,164 A | * | 9/1987 | Noguchi | 250/234 |
| 4,814,618 A | * | 3/1989 | Saito et al. | 250/587 |
| 5,336,976 A | * | 8/1994 | Webb et al. | 315/134 |
| 5,634,173 A | * | 5/1997 | Kamei | 399/52 |
| 5,845,159 A | * | 12/1998 | Goto | 396/97 |

(Continued)

FOREIGN PATENT DOCUMENTS

JP 2012-178227 9/2012

*Primary Examiner* — Negussie Worku
(74) *Attorney, Agent, or Firm* — Wenderoth, Lind & Ponack, L.L.P.

(57) ABSTRACT

An image reading device includes a light source, an imaging element and a control unit. The light source irradiates light on a document. The irradiated light of the light source reflected by the document is incident on the imaging element. The control unit is configured to, if the document is an ordinary document having no light-emitting screen, set a light amount of the irradiated light of the light source at a predetermined reference value and is configured to, if the document is a special document having a light-emitting screen, reduce the light amount of the irradiated light of the light source to become lower than the reference value.

7 Claims, 6 Drawing Sheets

(56) References Cited

U.S. PATENT DOCUMENTS

| | | | |
|---|---|---|---|
| 5,932,871 A * | 8/1999 | Nakagawa et al. | 250/201.3 |
| 5,973,843 A * | 10/1999 | Nakamura | 359/619 |
| 7,001,097 B2 * | 2/2006 | Wang et al. | 403/231 |
| 8,441,582 B2 * | 5/2013 | Hirata et al. | 348/756 |
| 8,525,899 B2 * | 9/2013 | Imai | 348/223.1 |
| 8,698,848 B2 * | 4/2014 | Yamamoto et al. | 345/690 |
| 8,744,293 B2 * | 6/2014 | Shirasaki et al. | 399/45 |
| 8,760,445 B2 * | 6/2014 | Shao et al. | 345/207 |
| 2005/0185229 A1 * | 8/2005 | Sano et al. | 358/498 |
| 2005/0195317 A1 * | 9/2005 | Myoga | 348/370 |
| 2014/0152735 A1 * | 6/2014 | Yorimoto et al. | 347/19 |
| 2014/0293371 A1 * | 10/2014 | Kurokawa | 358/475 |

* cited by examiner

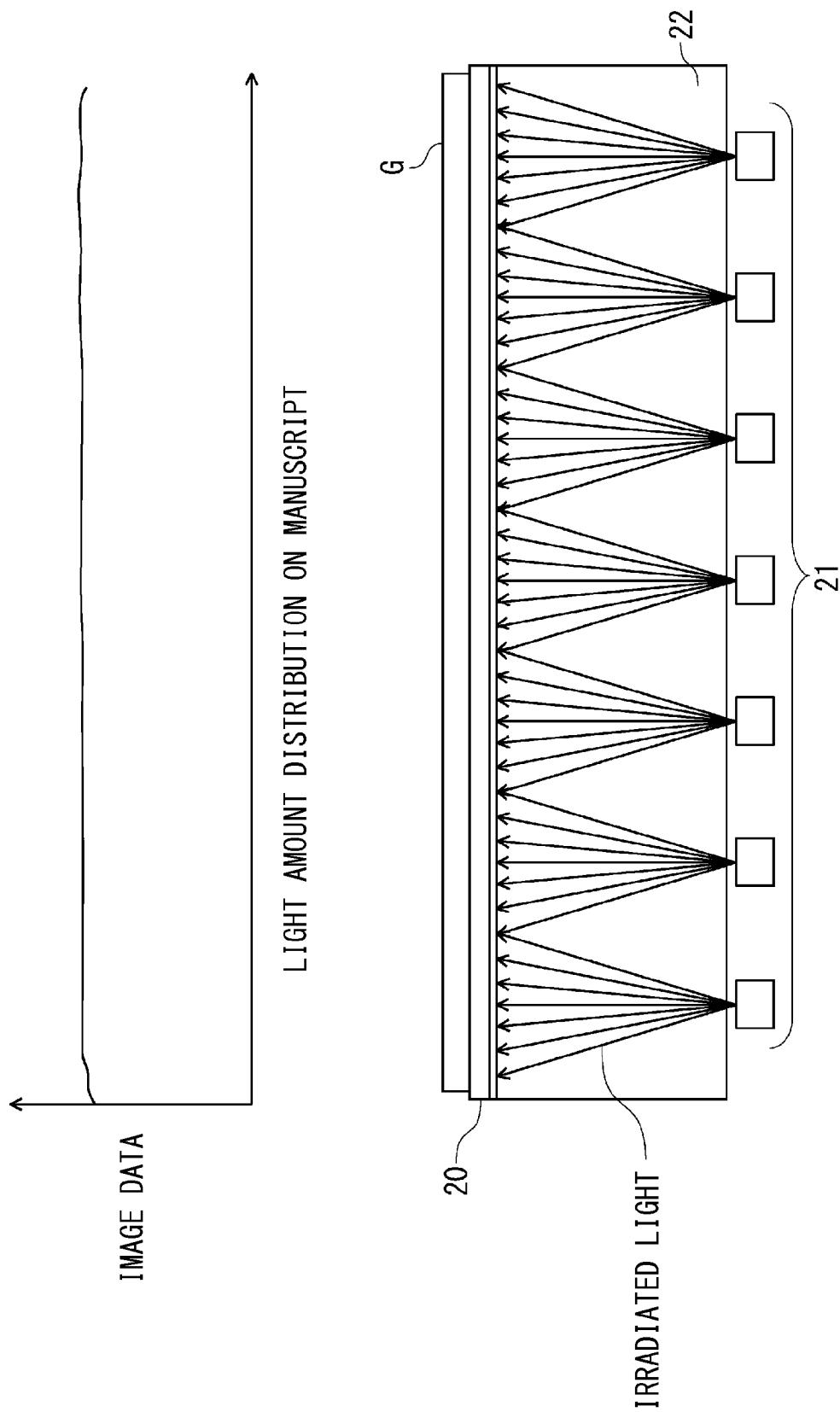

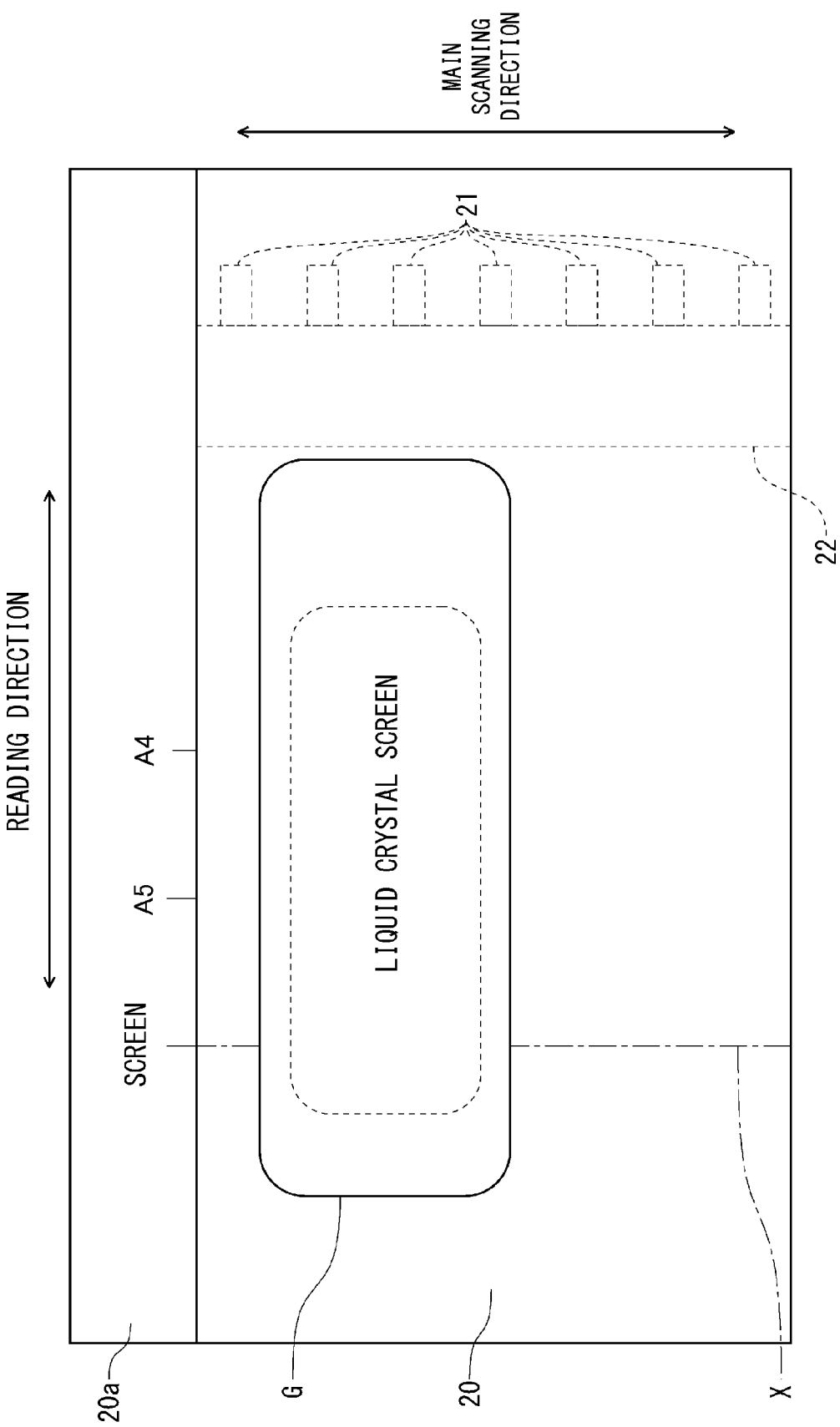

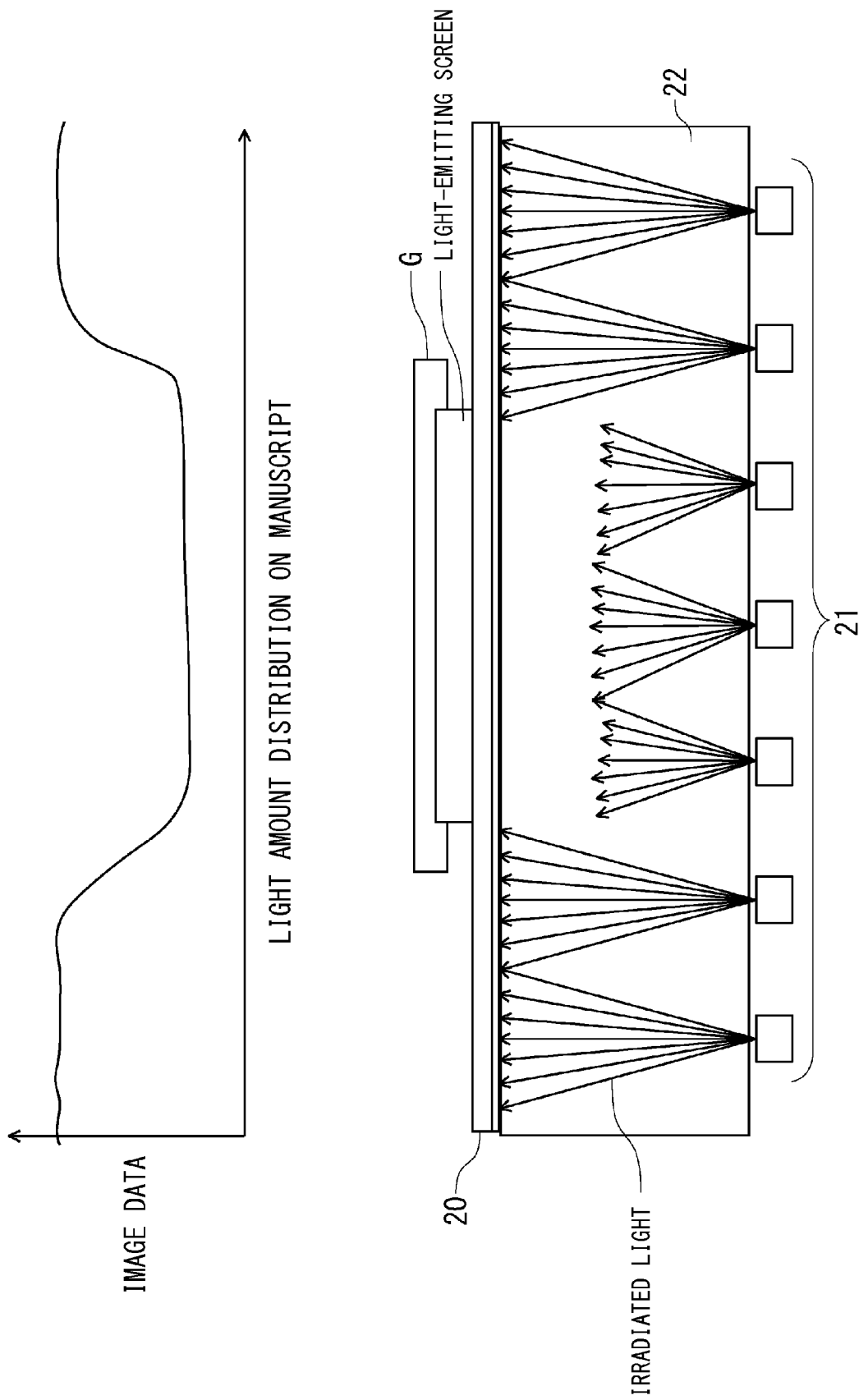

IMAGE READING DEVICE AND IMAGE FORMING APPARATUS

CROSS-REFERENCE TO RELATED APPLICATION

This application is based upon and claims the benefit of priority from Japanese Patent Application No. 2013-226776 filed on Oct. 31, 2013, the entire contents of which are incorporated herein by reference.

BACKGROUND

The technology of the present disclosure relates to an image reading device and an image forming apparatus provided with the image reading device.

In general, in an image reading device, the light of a light source is irradiated on a document placed on a contact glass. The light irradiated on the document is reflected. Some of the scattering light is condensed by an imaging lens and is incident on an imaging element (CCD). In the imaging element, the amount of the incident light is converted to charges. The density of an image is determined depending on the amount of charges.

SUMMARY

An image reading device according to one aspect of the present disclosure includes a light source, an imaging element and a control unit. The light source irradiates light on a document. The irradiated light of the light source reflected by the document is incident on the imaging element. The control unit is configured to, if the document is an ordinary document having no light-emitting screen, set a light amount of the irradiated light of the light source at a predetermined reference value and is configured to, if the document is a special document having a light-emitting screen, reduce the light amount of the irradiated light of the light source to become lower than the reference value.

An image forming apparatus according to another aspect of the present disclosure is provided with the aforementioned image reading device.

BRIEF DESCRIPTION OF THE DRAWINGS

FIG. 4 is a view showing the amount of irradiated light of light sources in case of an ordinary document.

FIG. 5 is a plane view showing a contact glass.

FIG. 6 is a view showing the amount of irradiated light of light sources in case of a special document.

DETAILED DESCRIPTION

An embodiment of the present disclosure will now be described in detail with reference to the accompanying drawings. The technology of the present disclosure is not limited to the embodiment described below.

Figure 1:
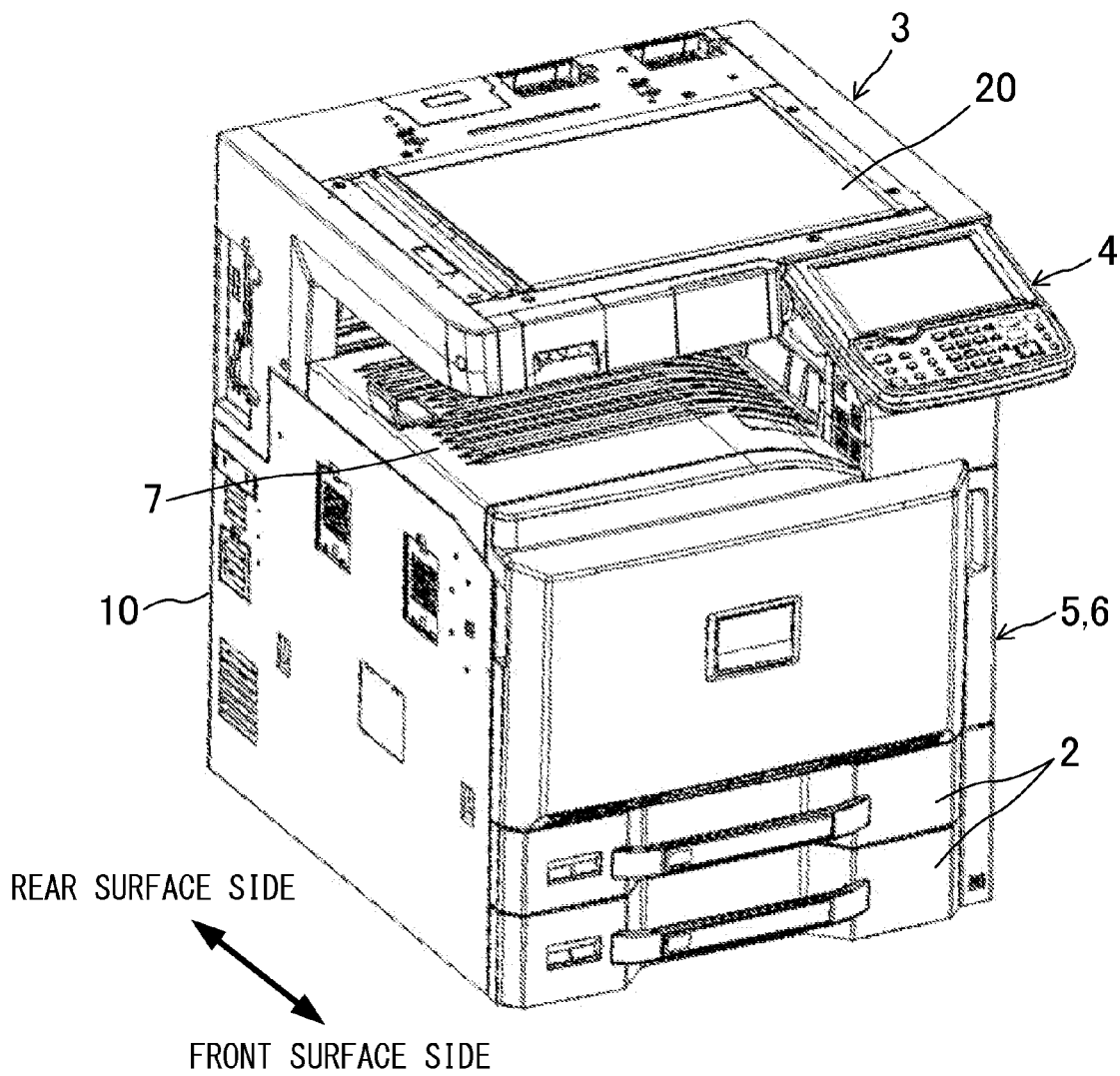
FIG. 1 is a perspective view showing the outward appearance of an image forming apparatus.
Figure 2:
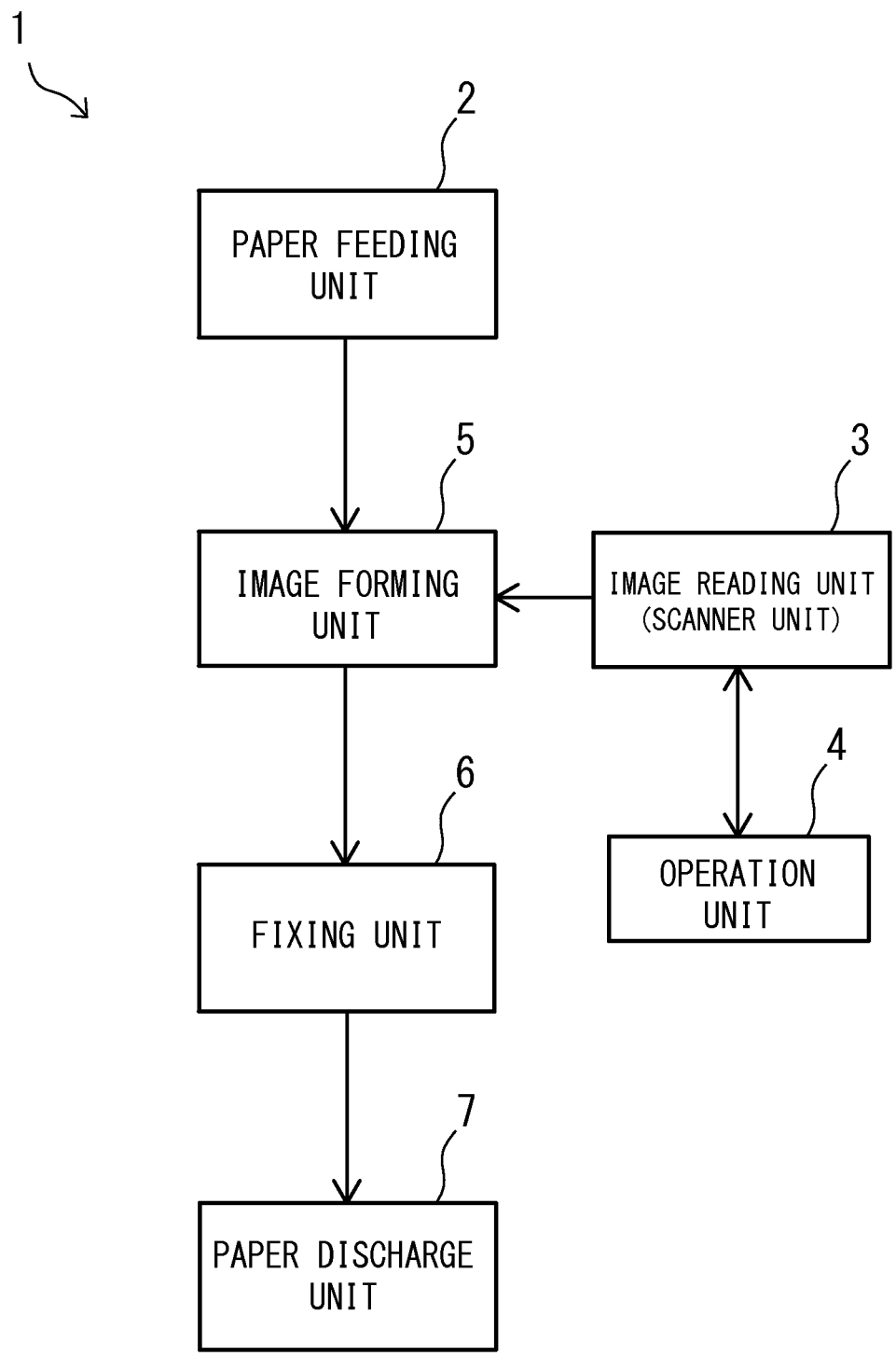
FIG. 2 is a block diagram showing the schematic configuration of the image forming apparatus.

As shown in FIGS. 1 and 2, an image forming apparatus 1 of the present embodiment is, e.g., a multifunction peripheral. The image forming apparatus 1 includes a paper feeding unit 2, an image reading unit 3 (scanner unit), an operation unit 4, an image forming unit 5, a fixing unit 6 and a paper discharge unit 7. In the image forming apparatus 1, the image reading unit 3 is installed above a body 10. The operation unit 4 is installed at the front side of the image reading unit 3. The image forming unit 5, the fixing unit 6 and the paper feeding unit 2 are installed in the central portion and the lower portion of the body 10. The paper discharge unit 7 is installed below the image reading unit 3. The image reading unit 3 constitutes an image reading device.

The paper feeding unit 2 is a cassette paper feeding unit or a manual insertion tray which supplies a paper to the image forming unit 5. The image reading unit 3 reads a document G as an image. Details of the image reading unit 3 will be described later. In the operation unit 4, various kinds of operations for the image forming apparatus 1 are performed. While not shown in the drawings, the image forming unit 5 includes a photosensitive drum, a charger, a developer and a transfer roller, and so forth. The charger, the developer and the transfer roller are disposed around the photosensitive drum. The image forming unit 5 transfers a toner image to the paper supplied from the paper feeding unit 2, based on the image data read by the image reading unit 3 or the image data transmitted from an external terminal. The fixing unit 6 includes a fixing roller and a pressing roller (not shown) which are pressed against each other and are rotated together. The fixing unit 6 fixes the image (toner image) transferred to the paper in the image forming unit 5 to the paper. The paper on which the image is formed is supplied from the fixing unit 6 to the paper discharge unit 7.

(Configuration of Image Reading Unit)

Figure 3:
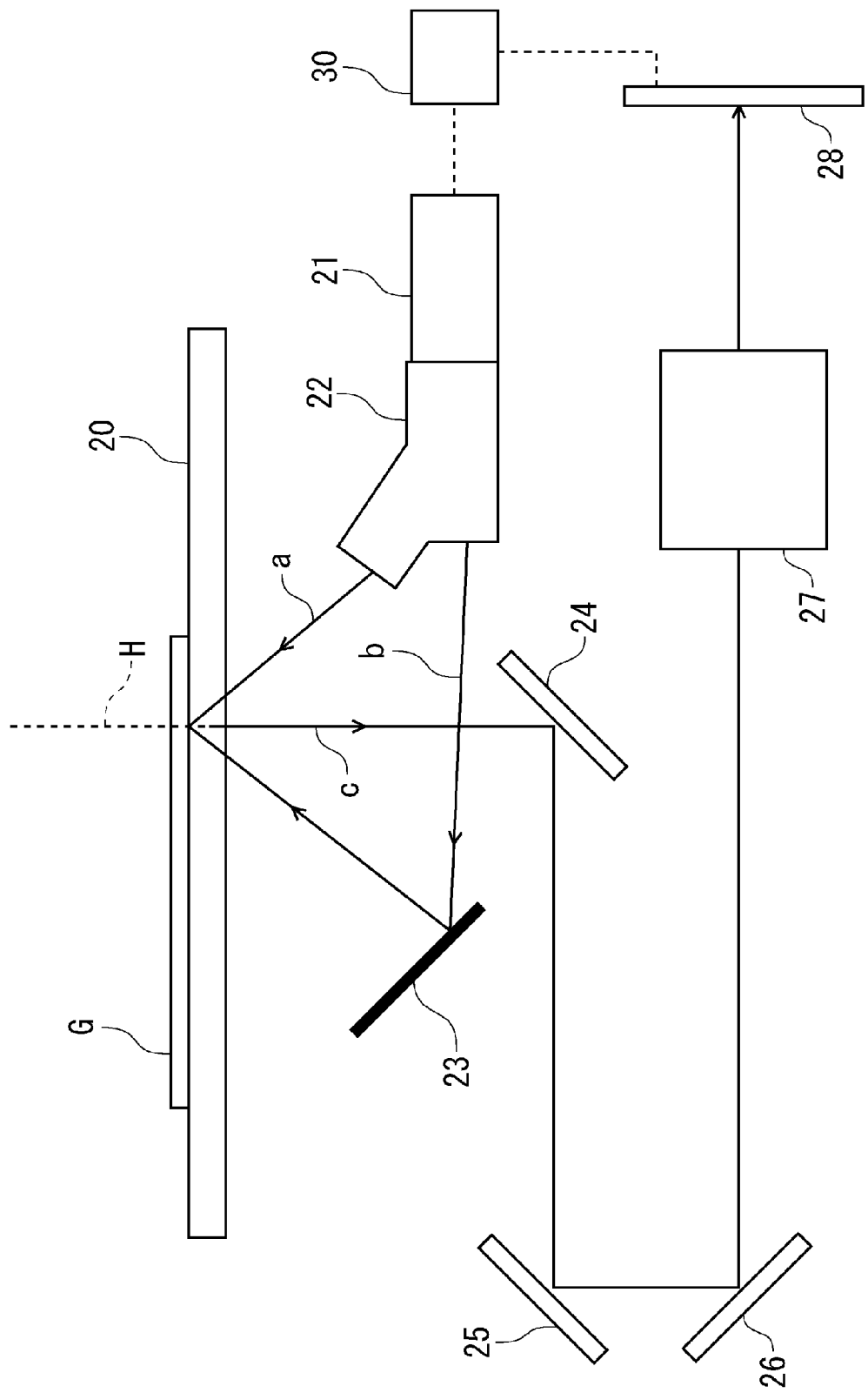
FIG. 3 is a schematic configuration view showing an image reading device.

As shown in FIG. 3, the image reading unit 3 includes a contact glass 20 on which a document G is placed, light sources 21, a light guide 22, a reflection plate 23, three mirror 24, 25 and 26, an imaging lens 27 and an imaging element 28.

The light sources 21 are, e.g., white LEDs. The light sources 21 irradiate light on the document G through the light guide 22. A plurality of (seven, in the present embodiment) light sources 21 is disposed along a main scanning direction (see FIG. 5). The light guide 22 is made of, e.g., an acryl resin. The imaging element 28 is, e.g., a CCD (Charge Coupled Device) sensor.

In the image reading unit 3, the light irradiated from the light sources 21 is incident on the light guide 22 and is divided into two light beams within the light guide 22. One of the light beams is directly irradiated on the document G from the light guide 22 (see the light beam a). The other light beam is irradiated on the reflection plate 23 from the light guide 22, reflected by the reflection plate 23 and irradiated on the document G (see the light beam b). The light beam b is irradiated on the document G at the opposite side of a reading optical axis H from the light beam a. In this way, the light emitted from the light sources 21 is irradiated on the document G.

Some of the scattering light (see the light beam c) irradiated on and reflected by the document G is sequentially reflected by three mirrors 24, 25 and 26 and is incident on the imaging lens 27. The light incident on the imaging lens 27 is condensed and is incident on the imaging element 28. The imaging element 28 determines the density of an image depending on the amount of the incident light (the incident light amount).

The light sources 21, the light guide 22, the reflection plate 23 and the mirror 24 constitute an illumination unit. The illumination unit is configured such that it can move in a reading direction (see FIG. 5) of the contact glass 20. Upon moving the illumination unit, the reading optical axis H is moved to an arbitrary position.

The image reading unit 3 includes a control unit 30 for adjusting the amount of the irradiated light of the light sources 21. The control unit 30 is configured to set the amount of the irradiated light of the light sources 21 at a predetermined reference value, in case where the document (i.e., object) G is an ordinary document having no light-emitting screen, and to reduce the amount of the irradiated light of the light sources 21 to become lower than the reference value, in case where the document (i.e., object) G is a special document (object) having a light-emitting screen. The light-emitting screen may be, e.g., a liquid crystal screen of a game machine or a cellular phone. The detailed operation of the control unit 30 will be described later.

(Operation of Image Reading Unit)

If the document G is an ordinary document having no light-emitting screen, an ordinary reading operation (hereinafter referred to as an "ordinary document mode") is performed. In the ordinary reading operation, the control unit 30 sets the amount of the irradiated light of the light sources 21 at a predetermined reference value. Then, as shown in FIG. 4, the respective light sources 21 irradiates light at a mutually identical light amount (reference value). In other words, the light amount distribution of the light irradiated on the document G is substantially constant in the main scanning direction. The light irradiated on and reflected by the document G is incident on the imaging element 28 through the three mirrors 24, 25 and 26 and the imaging lens 27. In the imaging element 28, the density of an image is determined depending on the amount of the incident light. The image forming unit 5 forms an image on a paper based on the density determined by the imaging element 28.

If the document G is a special document having a light-emitting screen, the image reading unit 3 is configured to initially perform a preliminary detection operation and then perform a reading operation of the document G (hereinafter referred to as a "special document mode") based on the result of the preliminary detection operation.

The preliminary detection operation is performed to detect the light-emitting amount and the position (light-emitting position) of the light-emitting screen of the document G. More specifically, in the preliminary detection operation, the irradiation of light of the light sources 21 is stopped by the control unit 30. In this state, a user places the document G having the light-emitting screen on the contact glass 20. As shown in FIG. 5, a "screen" position is indicated on a size bulletin board 20a of the contact glass 20. The document G is placed such that the light-emitting screen is positioned on a line of the "screen" position (hereinafter referred to as a "screen line X"). The illumination unit is moved such that the reading optical axis H is positioned on the screen line X. In this state, the light emitted from the light-emitting screen is incident on the imaging element 28 through the three mirrors 24, 25 and 26 and the imaging lens 27. The imaging element 28 detects the amount of the incident light (the light-emitting amount of the light-emitting screen) and the position (light-emitting position) of the light-emitting screen in the main scanning direction. The light-emitting amount and the light-emitting position of the light-emitting screen thus detected are inputted to the control unit 30. Thus, the control unit 30 determines that the document G is a special document having a light-emitting screen. In this way, the preliminary detection operation is finished.

Next, the reading operation of the document G is performed. The control unit 30 which has determined that the document G is a special document adjusts the light amount of the light sources 21 based on the light-emitting amount and the light-emitting position of the light-emitting screen inputted to the control unit 30. More specifically, as shown in FIG. 6, the control unit 30 sets the amount of the light irradiated from the light sources 21 corresponding to the light-emitting position among the plurality of (seven) light sources 21 so as to become lower than the light-emitting amount of the light-emitting screen. In other words, the light amount of the light sources 21 corresponding to the light-emitting position is set at a value lower than the reference value. Furthermore, the control unit 30 sets the amount of the light irradiated from the light sources 21 other than the light sources 21 corresponding to the light-emitting position so as to become equal to the reference value as in the ordinary reading operation. By doing so, the light amount distribution of the light irradiated on the document G becomes as shown in FIG. 6. That is to say, the amount of the light irradiated on the document G becomes lower in the region where the light-emitting screen is positioned. In addition, by performing a linear interpolation or the like, the light amount is gradually changed between a light amount reduction point and a light amount non-reduction point such that the light amount should not be sharply changed.

Since the light amount of the light sources 21 corresponding to the light-emitting screen (the light-emitting position) is reduced to become lower than the light-emitting amount of the light-emitting screen as described above, the ratio of the light-emitting amount of the light-emitting screen to the light amount of the surroundings is increased. This enables the light-emitting screen to display an image at the original density gradation. The light-emitting screen displays an image at the light-emitting amount thereof. Therefore, if the light-emitting amount of the light-emitting screen is extremely lower than the light amount of the surroundings, an image is not displayed. In that case, the imaging element detects the light-emitting screen as a black image. In contrast, according to the present embodiment, an image can be displayed in the light-emitting screen as mentioned above. This enables the imaging element 28 to appropriately determine the density of the image of the light-emitting screen. Accordingly, it is possible to clearly read the image of the light-emitting screen without regarding the image of the light-emitting screen as a black image.

Only the light amount of the light sources 21 corresponding to the light-emitting screen is reduced without reducing the light amount of all the light sources 21. It is therefore possible to prevent the portion other than the light-emitting screen from becoming blackish and to prevent the image from becoming poor. It is also possible to prevent an unnecessarily large amount of toner form being consumed during the image formation.

MODIFIED EXAMPLE OF EMBODIMENT

In the embodiment described above, if the control unit 30 determines through the preliminary detection operation that the document G is a special document, a screen for selecting whether to perform the reading operation in the ordinary document mode or in the special document mode may be displayed on the operation unit 4. In case where the ordinary document mode is selected by a user, the control unit 30 performs the reading operation by setting the light amount of the respective light sources 21 at the reference value as mentioned above. In case where the special document mode is selected by a user, the control unit 30 performs the reading operation by setting only the light amount of the light sources 21 corresponding to the light-emitting screen to become lower than the light-emitting amount (reference value) as mentioned above.

In the embodiment described above, if the control unit 30 determines through the preliminary detection operation that the document G is a special document, only the light amount of the light sources 21 corresponding to the light-emitting screen is reduced. Alternatively, the light amount of all the light sources 21 may be reduced.

In the embodiment described above, the preliminary detection operation may be omitted and a screen for enabling a user to select one of the ordinary document mode and the special document mode may be preliminarily displayed on the operation unit 4. In this case, if a user selects the ordinary document mode, the control unit 30 performs the reading operation by setting the light amount of the respective light sources 21 at the reference value as mentioned above. If a user selects the special document mode, the control unit 30 performs the reading operation by reducing the light amount of all the light sources 21.

As described above, the technology of the present disclosure is useful in an image reading device and an image forming apparatus provided with the image reading device.

What is claimed is:

1. An image reading device, comprising:
   a light source configured to irradiate light on an object;
   an imaging element on which the irradiated light of the light source reflected by the object is incident; and
   a control unit configured to control a light amount of the irradiated light of the light source, wherein
   the imaging element is configured to, when the object has a light-emitting screen in a state in which the irradiation of light of the light source is stopped, detect a light amount of light emitted from the light-emitting screen of the object and incident on the imaging element, and
   the control unit is configured to, if the imaging element does not detect the light amount in the state in which the irradiation of light of the light source is stopped, determine that the object is an ordinary document having no light-emitting screen and set the light amount of the irradiated light of the light source at a predetermined reference value, and configured to, if the imaging element detects the light amount in the state in which the irradiation of light of the light source is stopped, determine that the object has the light emitting-screen and reduce the light amount of the irradiated light of the light source to become lower than the light amount of the incident light from the light-emitting screen detected by the imaging element.

2. The device of claim 1, wherein the light source includes a plurality of light sources disposed along a main scanning direction,
   the imaging element is configured to, in the state in which the irradiation of light of the light sources is stopped, detect the light amount of light emitted from the light-emitting screen of the object and incident on the imaging element and a light-emitting position of the object in the main scanning direction, and
   the control unit is configured to, if the imaging element detects the light amount and the light-emitting position in the state in which the irradiation of light of the light sources is stopped, determine that the object has the light-emitting screen and reduce the light amount of the irradiated light of the light sources corresponding to the light-emitting position detected by the imaging element to become lower than the light amount of the incident light from the light-emitting screen detected by the imaging element.

3. An image forming apparatus provided with the image reading device of claim 1.

4. The apparatus of claim 3,
   further comprising: an operation unit configured to, if the imaging element detects the light amount, display that the object has the light-emitting screen and enable a user to select one of an ordinary document mode and a special document mode,
   wherein the control unit is configured to, if the ordinary document mode is selected in the operation unit, set the light amount of the irradiated light of the light source at the reference value and is configured to, if the special document mode is selected in the operation unit, reduce the light amount of the irradiated light of the light source to become lower than the light amount of the incident light from the light-emitting screen detected by the imaging element.

5. The apparatus of claim 1, wherein the light-emitting screen displays an image at the light-emitting amount thereof.

6. An image reading device, comprising:
   a light source configured to irradiate light on an object;
   an imaging element on which the irradiated light of the light source reflected by the object is incident; and
   a control unit configured to control a light amount of the irradiated light of the light source, wherein
   the imaging element is configured to, when the object has a light-emitting screen and in a state in which the irradiation of light of the light source is stopped, detect a light amount of light emitted from the light-emitting screen of the object and incident on the imaging element, and the image reading device further comprising,
   an operation unit configured to enable a user to select one of an ordinary document mode and a special document mode, wherein
   the control unit is configured to, in a case where the ordinary document mode is selected in the operation unit, determine that the object is an ordinary document having no light-emitting screen and set the light amount of the irradiated light of the light source at a predetermined reference value, and is configured to, in a case where the special document mode is selected in the operation unit, determine that the object has the light emitting screen and reduce the light amount of the irradiated light of the light source to become lower than the light amount of the incident light from the light-emitting screen detected by the imaging element.

7. The apparatus of claim 6, wherein the light-emitting screen displays an image at the light-emitting amount thereof.

* * * * *